(12) United States Patent
Perälä et al.

(10) Patent No.: US 6,658,709 B2
(45) Date of Patent: Dec. 9, 2003

(54) METHOD FOR MANUFACTURING SHRINK FABRIC, AND SHRINK FABRIC

(75) Inventors: Aulis Perälä, Pirkkala (FI); Eino Sorri, Tampere (FI)

(73) Assignee: Tamfelt OYJ ABP, Tampere (FI)

( * ) Notice: Subject to any disclaimer, the term of this patent is extended or adjusted under 35 U.S.C. 154(b) by 0 days.

(21) Appl. No.: 09/981,825

(22) Filed: Oct. 19, 2001

(65) Prior Publication Data

US 2002/0050036 A1 May 2, 2002

Related U.S. Application Data

(63) Continuation of application No. PCT/FI00/00340, filed on Apr. 19, 2000.

(30) Foreign Application Priority Data

Apr. 21, 1999 (FI) .................................................. 990900

(51) Int. Cl.[7] .................................................. D03D 3/02
(52) U.S. Cl. .................................................. 28/142; 28/157
(58) Field of Search .................................................. 28/142, 155, 157, 28/151, 140, 156, 100, 153, 141, 143, 154, 165; 210/400, 401, 402, 403, 404, 396; 139/383 R, 384 R, 387 R, 388, 407, 383 A, 383 AA; 66/169 R, 170, 171; 112/63, 402, 475.01, 475.17; 493/269, 299, 303; 2/275; 26/18.5, 18.6

(56) References Cited

U.S. PATENT DOCUMENTS

| | | | | |
|---|---|---|---|---|
| 893,356 A | * | 7/1908 | Nelke | 28/157 |
| 1,615,517 A | * | 1/1927 | Mundorf | 28/157 |
| 2,368,216 A | * | 1/1945 | Hastings et al. | 28/142 |
| 2,517,704 A | * | 8/1950 | Overbeke | 210/497.01 |
| 2,928,160 A | * | 3/1960 | Mayer | 28/157 |
| 2,962,795 A | * | 12/1960 | Evans et al. | 28/157 |
| 3,061,944 A | * | 11/1962 | Kraus et al. | 210/402 |
| 3,441,951 A | * | 4/1969 | Lee | 210/400 |
| 3,478,991 A | * | 11/1969 | Schiel et al. | 24/31 H |
| 3,704,788 A | * | 12/1972 | Goodman et al. | 210/401 |
| 3,747,770 A | * | 7/1973 | Zentis | 210/402 |
| 4,017,401 A | * | 4/1977 | Holz | 210/493.1 |
| 4,097,621 A | * | 6/1978 | Shirasaka et al. | 28/157 |
| 4,305,821 A | | 12/1981 | Crandall et al. | |
| 4,357,714 A | * | 11/1982 | Ito | 28/157 |
| 4,426,795 A | * | 1/1984 | Rudt | 139/383 A |
| 4,869,823 A | * | 9/1989 | Otani et al. | 210/403 |
| 4,972,561 A | | 11/1990 | Aldrich | |
| 5,217,415 A | | 6/1993 | Wasylezuck et al. | |
| 5,232,429 A | * | 8/1993 | Cizek et al. | 493/299 |
| 5,312,660 A | * | 5/1994 | Morris et al. | 28/142 |
| 5,743,560 A | * | 4/1998 | Jackson et al. | 280/741 |
| 6,265,048 B1 | * | 7/2001 | Rydin et al. | 28/142 |

FOREIGN PATENT DOCUMENTS

JP 56-004399 1/1981

* cited by examiner

*Primary Examiner*—Amy B. Vanatta
(74) *Attorney, Agent, or Firm*—McDermott, Will & Emery

(57) ABSTRACT

A method for manufacturing a shrink fabric, and a shrink fabric to be used for filtering. The method is used for manufacturing a shrink fabric (1, 1') comprising a seam assembly (4) which is substantially diagonal with respect to the lateral direction of the shrink fabric (1, 1'). When arranged in place onto a drum filter, the seam assembly (4) of the shrink fabric (1, 1') is substantially diagonal with respect to the lateral direction of the drum (2) of the drum filter.

11 Claims, 2 Drawing Sheets

METHOD FOR MANUFACTURING SHRINK FABRIC, AND SHRINK FABRIC

Figure 1:
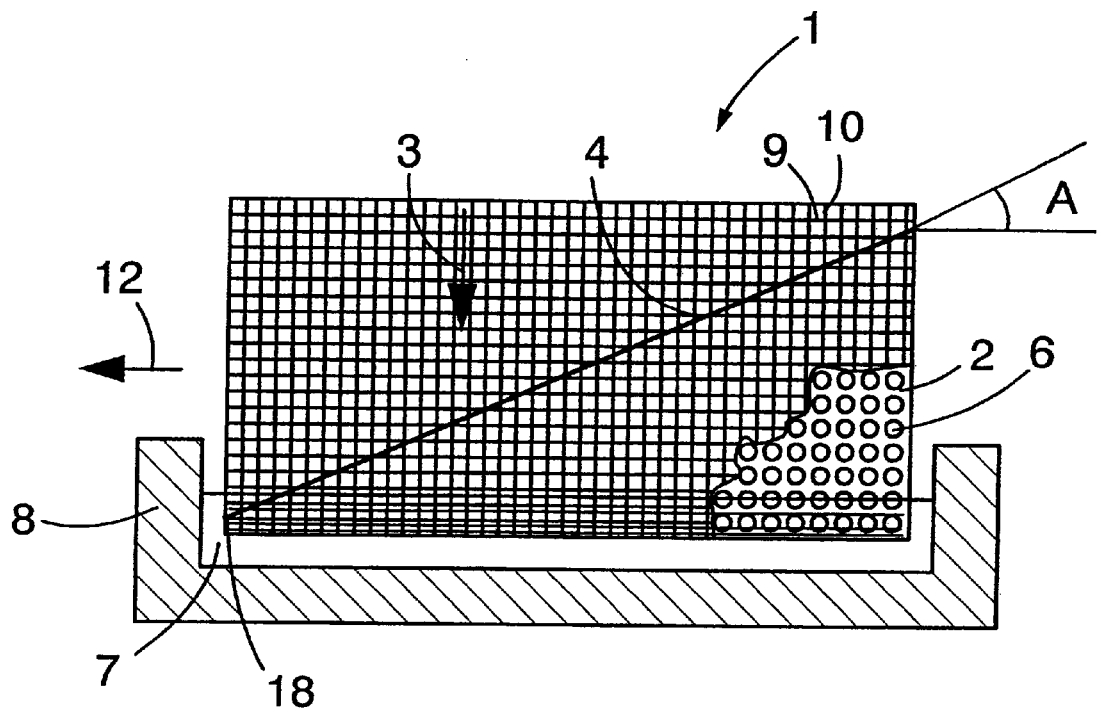

This application is a continuation of International Application No. PCT/FI00/00340, whose international filing date is Apr. 19, 2000, which in turn claims the benefit of Finland Application No. 990900, filed Apr. 21, 1999, the disclosures of which applications are incorporated by reference herein. The benefit of the filing and priority dates of the International and Finland applications is respectfully requested.

The invention relates to a method for manufacturing a shrink fabric to be used for filtering, the shrink fabric comprising a seam assembly, weft threads and warp threads.

The invention further relates to a shrink fabric to be used for filtering, the shrink fabric comprising a seam assembly, weft threads and warp threads.

Shrink fabrics used in drum filters are usually two-layer shrink fabrics, because they offer better filtering efficiency and operational reliability than corresponding single-layer shrink fabrics. Shrink fabrics are made of a fabric woven of warp threads running in the longitudinal direction of the weaving machine and weft threads running in its cross, or lateral, direction, the threads being interwoven in the weaving. The threads in the shrink fabric are arranged so that the wefts run substantially in the longitudinal direction of the shrink fabric, the longitudinal direction of the shrink fabric meaning the direction arranged substantially parallel with the peripheral direction of the drum, and the warps run substantially in the lateral direction of the shrink fabric, the lateral direction of the shrink fabric referring to the direction arranged parallel with the drum axle. It should be noted, that in this context the term thread is used to refer to both mono- and multifilament threads made of a material that usually comprises a polymer, such as polyester, polyvinylidene fluoride, polyphenylene sulfide, polyetherether ketone, polyamide, polypropylene or some other suitable material, the cross-section of the threads being annular, elliptic, rectangular or any other shape known per se. By varying fabric structures and their combinations, a shrink fabric with the desired characteristics for different purposes and circumstances of use can be obtained. For liquid to be efficiently separated from a mixture of liquid and solids, the liquid permeability of the shrink fabric must be balanced with its solids holding characteristics. Other important characteristics affecting the utilization and costs of the shrink fabric, which is often used in most demanding circumstances, are its dimensional stability and durability.

The shrink fabric is arranged onto the drum so that the weft threads run in the peripheral direction of the drum and the warp threads in its axial direction. The fabric ends are joined together by means of a seam assembly made using fixing members, such as a seam thread arranged through seam loops, a zipper or any other fixing member known per se, the fabric being then shrunk onto the drum by means of heat. When the drum filter rotates about its axle, the solids that accumulate onto the surface of the fabric are scraped using a doctor blade arranged adjacent to the shrink fabric, substantially parallel with the drum axle. The seam assembly formed when the ends of the fabric are joined together is slightly thicker than the fabric and therefore the seam touches the doctor blade. This takes place every time the drum revolves and it causes an impact-type load on the seam assembly and the entire shrink fabric; the load thus stressing and wearing the seam and the shrink fabric often considerably reduces the service life of the shrink fabric. Due to the load on the seam, the shrink fabric has to be serviced and replaced more often than the durability of the seam would require. This causes additional costs arising from the servicing and purchase of the shrink fabric and unnecessary down time caused thereby. If the doctor blade is arranged at a distance required by the seam assembly from the shrink fabric surface, the doctor blade does not remove all the solids from the surface, which reduces the efficiency of the filter.

An object of the present invention is to provide a method for manufacturing a shrink fabric, and a shrink fabric where the above problems do not appear.

The method of the invention is characterized in that the seam assembly is arranged substantially diagonally with respect to the lateral direction of the shrink fabric.

The shrink fabric of the invention is characterized in that the seam assembly is arranged substantially diagonally with respect to the lateral direction of the shrink fabric.

An essential idea of the invention is that the seam assembly of the shrink fabric is arranged substantially diagonally with respect to the lateral direction of the fabric. In this context, diagonal means that the direction of the seam deviates substantially from the lateral direction of the fabric. A preferred embodiment is based on the idea that the seam assembly is at an angle of 15 to 75° with respect to the lateral direction of the fabric. Further, according to another preferred embodiment, the angle of the seam assembly is substantially 45° with respect to the lateral direction of the fabric. The method of the invention is based on the idea that when the shrink fabric is manufactured, the forward edge and the rear edge of the fabric that are to be joined together are at a diagonal angle to the lateral direction of the fabric, the direction of the seam assembly arranged on the drum being substantially diagonal with respect to the axial direction of the drum.

An advantage of the invention is that the forces and loads caused by the doctor blade and acting on the seam assembly and, through the seam, on the entire fabric are substantially reduced because only a very small portion of the seam, i.e. the foremost portion in the direction of rotation of the drum, meats the doctor blade suddenly and abruptly, the contact between the seam and the doctor blade being thereafter substantially constant, without sudden loads. In addition, the seam is longer than a prior art seam and therefore the forces acting on the fabric in the peripheral direction of the drum, i.e. in its rotational direction, cause a lower tension to the seam. On the whole, the service life of the shrink fabric is increased and its operational reliability improved, which reduces the costs of purchase, installation and use of the shrink fabric.

Figure 2:
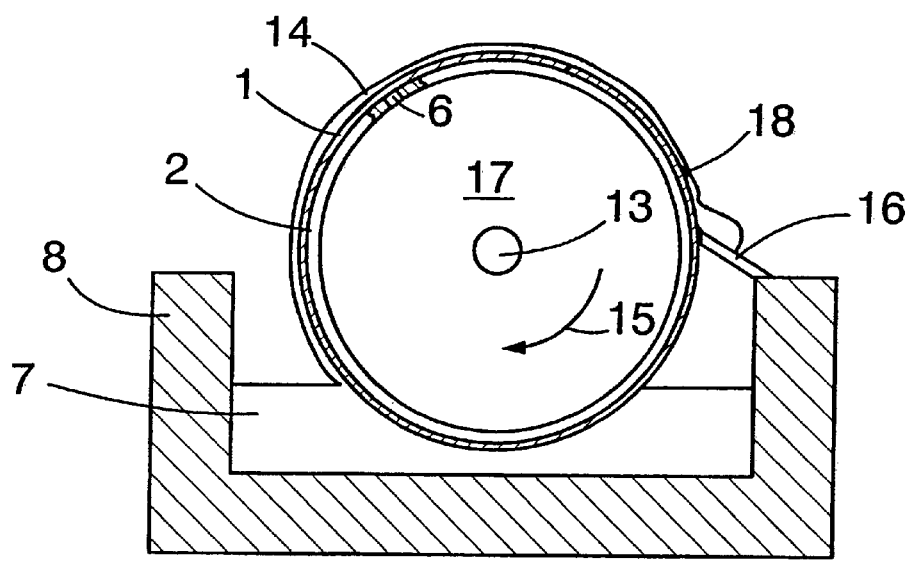
Figure 3:
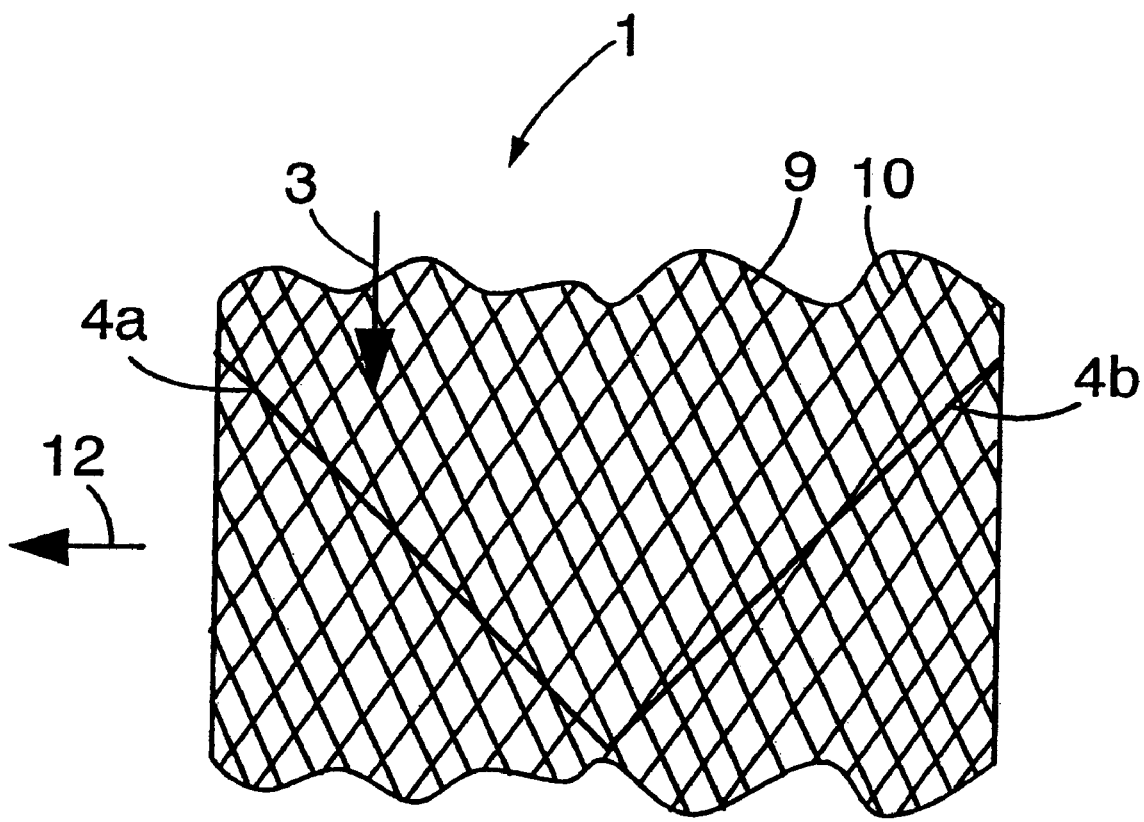

The invention will be described in greater detail with reference to the accompanying drawings, in which FIG. 1 is a schematic, partly sectional side view of an embodiment of a shrink fabric of the invention arranged onto a drum filter;

FIG. 2 is a schematic, partly sectional axial view of another embodiment of the shrink fabric of the invention arranged onto a drum filter; and FIG. 3 illustrates a third embodiment of the shrink fabric of the invention.

FIG. 1 is a schematic and strongly simplified, partly sectional side view of an embodiment of the shrink fabric of the invention. The shrink fabric 1, the structure, bonds, thread material and other similar characteristics of which have been selected to suit the special requirements of the application concerned, can be arranged onto a drum 2 for example by pulling first one edge of the shrink fabric 1 around the drum 2 and joining together fixing members arranged at the forward and rear ends on the shrink fabric 1 edge in question. The rest of the fixing members at the forward and rear ends are then joined together along the entire length of the shrink fabric 1, possibly rotating the drum 2 at the same time in a suitable manner. The joined fixing members form a seam assembly 4 to the shrink fabric. The fixing members may comprise fixing loops and a seam thread, or a zipper-type arrangement, for example, which are well known to a person skilled in the art and therefore need not be discussed in greater detail in this context. The shrink fabric 1 is shrunk tightly against the drum 2 by heating the fabric 1 for example with steam, hot water or a heat radiator in a manner known per se. The drum 2 is provided with openings 6 made by drilling, for example. The form of the openings 6 can be other than the one shown in the Figure, provided that the openings 6 extend through the thickness of the drum 2 wall. A mixture 7 of the liquid and the solids to be filtered is introduced into a basin 8 using means that are not shown, for reasons of clarity, in the Figure. The basin 8 contains a predetermined amount of the mixture 7 so that the mixture extends at least to the lower portion of the drum 2. The drum 2 rotates about its axle in the peripheral direction of the drum 2, shown by an arrow 3, and the liquid, usually water, in the mixture 7 flows through the shrink fabric 1 onto the periphery of the drum and further through the openings 6 inside the drum 2, the liquid being then removed from the drum in a manner known per se to a person skilled in the art by using means not shown in the Figure.

The shrink fabric 1 is manufactured so that the seam assembly 4 of the shrink fabric 1 forms an angle A with respect to the lateral direction of the fabric, the seam 4 arranged and shrunk onto the drum 2 then forming an angle A with respect to the axial direction 12 of the drum. In the embodiment shown in the Figure, the angle A is about 30°, but it can vary from 15 to 75°. In most cases the shrink fabric 1 also comprises other seams than the seam assembly 4, the angle of the seams possibly also forming an angle A with respect to the axial direction 12 of the drum. When the drum filter rotates, the seam 4 is exposed to forces acting particularly in the peripheral direction. In the shrink fabric 1 of the invention, the forces are spread over a longer portion of the seam than in a prior art seam, which substantially increases the durability of the seam 4 and thereby the service life of the entire shrink fabric 1. Furthermore, the forces acting in the rotational direction 3 are divided into force components, one of which is parallel with the seam 4, the other being perpendicular to the seam 4, whereby the perpendicular component, which causes a particularly strong load on the seam 4, is considerably smaller than in a prior art seam where the perpendicular component in practice comprises the entire active force. The seam 4 load can be distributed as uniformly as possible by using a seam 4 angle A of 45°, because then the force components acting on the seam 4 are equally great.

FIG. 2 is a schematic, partly sectional axial view of another embodiment of the shrink fabric arranged onto a drum filter. The drum is partially immersed into the mixture 7 of liquid and solids in a basin 8 where the drum rotates about its axle 13 in the direction shown by an arrow 15. The drum 2 rests in place supported to a body portion not shown in the Figure. About the drum 2 is arranged the shrink fabric 1 in a manner described in connection with FIG. 1. Mixture 7 is deposited onto the shrink fabric 1 and the liquid in the mixture 7 flows through the shrink fabric 1 onto the outer surface of the drum 2 and then enters the inside 17 of the drum 2 through openings 6 in the drum 2. The solids 14 accumulated on the shrink fabric 1 rotate together with the drum 2 and the shrink fabric 1. Outside the drum 2, at a short distance from the outer surface of the shrink fabric 1, is a doctor blade 16, arranged substantially along the entire width of the drum 2 and parallel with its axle to remove the solids 14 accumulated on the shrink fabric 1. The solids 14 removed by the doctor blade 16 are led away from the filter in a manner known per se by using means not shown in the Figure. After the doctor blade 16 the shrink fabric 1 is clean and ready to receive a new portion of the mixture 7. The seam 4 which protrudes slightly from the shrink fabric 1 touches the doctor blade only with its forward end, seen in the rotational direction of the drum 2, the seam 4 and the shrink fabric 1 being thereby exposed to a fairly small impact force. When the rotational movement continues, the seam 4 is in continuous contact with the doctor blade, hence the seam 4 or the shrink fabric 1 are not exposed to impact loads or other particularly stressing loads. Changes in the loads and stresses encountered by the seam 4 and the shrink fabric 1 are moderate and without any significant load peaks, so the shrink fabric 1 has significantly better durability than a prior art shrink fabric.

FIG. 3 shows a third embodiment of the shrink fabric of the invention. A shrink fabric 1' comprises weft threads 9 and warp threads 10 arranged diagonally with respect to the lateral direction of the shrink fabric 1' and, respectively, its longitudinal direction. Furthermore, the threads 9, 10 are not perpendicular to each other. It is naturally also possible that the angle between the thread directions is substantially 90° and they are diagonal with respect to the lateral direction and the longitudinal direction of the shrink fabric. The diagonal arrangement of the threads 9, 10 allows the magnitude of the forces and stresses acting on the threads 9, 10 to be influenced so that the special requirements and conditions of each shrink fabric application will be taken into account. The seam of the shrink fabric 1' is formed of two differently diagonal portions 4a, 4b, which meet at the centre portion of the shrink fabric 1'. When the seam 4 is formed of a plurality of differently diagonal portions, the point where the seam 4 first meets the doctor blade 18 can be chosen according to the requirements set by the application concerned. The shrink fabric 1' may naturally comprise more than one portion 4a, 4b, and all the portions 4a, 4b need not necessarily be diagonal.

The drawings and the related specification are only meant to illustrate the idea of the invention. The details of the invention may vary within the scope of the claims. The structure of the front end of the seam may be different from the rest of the seam to withstand particularly well the encounter with the doctor blade.

What is claimed is:

1. A method for manufacturing a shrink fabric to be used in a drumfilter for filtering, the shrink fabric being configured to shrink substantially when exposed to heat, and comprising a seam assembly, weft threads and warp threads, said method comprising the step of arranging the direction of the seam assembly substantially diagonally with respect to the lateral direction of the shrink fabric.

2. A method according to claim 1, wherein said step of arranging the direction of the seam assembly includes arranging the seam assembly at an angle of 15 to 75° with respect to the lateral direction of the shrink fabric.

3. A method according to claim 1 or 2, wherein said step of arranging the direction of the seam assembly includes arranging the seam assembly substantially at an angle of 45° with respect to the lateral direction of the shrink fabric.

4. A method according to claim 1 or 2, further including the step of arranging the directions of the weft threads and warp threads substantially diagonally with respect to the lateral and the longitudinal directions of the shrink fabric.

5. A method according to claim 1, wherein the shrink fabric is a two-layer shrink fabric.

6. A method according to claim 1, further including the step of arranging the shrink fabric onto said drumfilter.

7. A method according to claim 6, further including the step of heating the shrink fabric so as to shrink the shrink fabric tightly against the drumfilter.

8. A method according to claim 1, further including the step of arranging the direction of the warp threads substantially parallel with respect to the lateral direction of the shrink fabric.

9. A method according to claim 1, further including the step of arranging the direction of the weft threads substantially parallel with respect to the longitudinal direction of the shrink fabric.

10. A method according to claim 1, further including the step of arranging the directions of the warp and weft threads substantially parallel with respect to the lateral and the longitudinal directions, respectively, of the shrink fabric.

11. A method for manufacturing a filtering fabric configured in a loop for use on a drum, the filtering fabric comprising a seam assembly, said method comprising the step of arranging the direction of a seam assembly of the filtering fabric at an angle of 15° to 75° with respect to the lateral direction of the filtering fabric;

wherein the filtering fabric further comprises weft threads and warp threads; and wherein the filtering fabric is configured to shrink in response to the application of heat.

* * * * *